United States Patent
Tamai et al.

(10) Patent No.: US 9,321,931 B2
(45) Date of Patent: Apr. 26, 2016

(54) PRE-PROCESSING FLUID, INK SET, IMAGE FORMING APPARATUS, AND IMAGE FORMING METHOD

(71) Applicants: Takashi Tamai, Kanagawa (JP); Michihiko Namba, Kanagawa (JP); Shosuke Aoai, Shizuoka (JP)

(72) Inventors: Takashi Tamai, Kanagawa (JP); Michihiko Namba, Kanagawa (JP); Shosuke Aoai, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/739,114

(22) Filed: Jun. 15, 2015

(65) Prior Publication Data

US 2016/0024323 A1    Jan. 28, 2016

(30) Foreign Application Priority Data

Jul. 24, 2014   (JP) .................. 2014-150320

(51) Int. Cl.

| | |
|---|---|
| B41J 11/00 | (2006.01) |
| C09D 11/54 | (2014.01) |
| C09D 7/12 | (2006.01) |
| C09D 11/322 | (2014.01) |
| C08K 5/053 | (2006.01) |
| C08K 5/06 | (2006.01) |

(52) U.S. Cl.
CPC .............. C09D 11/54 (2013.01); C09D 7/1233 (2013.01); C09D 11/322 (2013.01); *B41J 11/0015* (2013.01); *C08K 5/053* (2013.01); *C08K 5/06* (2013.01)

(58) Field of Classification Search
CPC ...... B41J 11/0015; B41J 11/00; C09D 11/54; C09D 11/322; C09D 7/1233; C08K 5/053; C08K 5/06
See application file for complete search history.

(56) References Cited

U.S. PATENT DOCUMENTS

| | | |
|---|---|---|
| 2005/0054751 A1 | 3/2005 | Namba et al. |
| 2005/0231575 A1 | 10/2005 | Bannai et al. |
| 2007/0221078 A1 | 9/2007 | Namba et al. |
| 2008/0070008 A1 | 3/2008 | Namba et al. |
| 2008/0248260 A1 | 10/2008 | Kojima et al. |
| 2009/0162569 A1 | 6/2009 | Morohoshi et al. |
| 2009/0186162 A1 | 7/2009 | Namba et al. |
| 2009/0239044 A1 | 9/2009 | Habashi et al. |
| 2009/0258196 A1 | 10/2009 | Nagashima et al. |
| 2009/0263632 A1 | 10/2009 | Kojima et al. |
| 2010/0227067 A1 | 9/2010 | Namba et al. |
| 2010/0245416 A1 | 9/2010 | Ohshima et al. |
| 2010/0271435 A1 | 10/2010 | Kojima et al. |
| 2010/0279035 A1 | 11/2010 | Namba et al. |
| 2010/0302326 A1 | 12/2010 | Morohoshi et al. |

(Continued)

FOREIGN PATENT DOCUMENTS

JP     2011-079305     4/2011

*Primary Examiner* — Thinh Nguyen

(74) *Attorney, Agent, or Firm* — Oblon, McClelland, Maier & Neustadt, L.L.P.

(57) ABSTRACT

A pre-processing fluid contains water, a water soluble organic solvent, a water soluble flocculant, a compound represented by $C_6F_{13}$—$CH_2CH_2O(CH_2CH_2O)_nH$ Chemical formula 1, where n represents an integer of from 1 to 40, and a compound represented by $HOR_1R_3C$—$(CH_2)_m$—$CR_2R_4OH$ Chemical formula 2, where $R_1$ and $R_2$ each, independently represent alkyl groups having 3 to 6 carbon atoms, $R_3$ and $R_4$ each, independently represent methyl groups or ethyl groups, and m represents an integer of from 1 to 6.

7 Claims, 3 Drawing Sheets

(56) References Cited

U.S. PATENT DOCUMENTS

| | | |
|---|---|---|
| 2011/0092610 A1 | 4/2011 | Habashi et al. |
| 2011/0216123 A1 | 9/2011 | Tamai et al. |
| 2011/0300353 A1 | 12/2011 | Habashi et al. |
| 2011/0310166 A1 | 12/2011 | Namba et al. |
| 2012/0236066 A1 | 9/2012 | Tamai et al. |
| 2012/0320133 A1 | 12/2012 | Namba et al. |
| 2013/0084453 A1* | 4/2013 | Imokawa ............... C09D 5/084 428/341 |
| 2013/0113860 A1 | 5/2013 | Gotou et al. |
| 2013/0194345 A1 | 8/2013 | Tamai et al. |
| 2013/0201252 A1 | 8/2013 | Namba |
| 2013/0307912 A1 | 11/2013 | Masuda et al. |
| 2014/0192112 A1 | 7/2014 | Nagashima et al. |
| 2014/0192121 A1 | 7/2014 | Bannai et al. |
| 2014/0253631 A1 | 9/2014 | Namba et al. |

* cited by examiner

TRANSFER DIRECTION

PRE-PROCESSING FLUID, INK SET, IMAGE FORMING APPARATUS, AND IMAGE FORMING METHOD

CROSS-REFERENCE TO RELATED APPLICATIONS

This patent application is based on and claims priority pursuant to 35 U.S.C. §119(a) to Japanese Patent Application No. 2014-150320, filed on Jul. 24, 2014, in the Japan Patent Office, the entire disclosure of which is hereby incorporated by reference herein.

BACKGROUND

1. Technical Field

The present invention relates to a pre-processing fluid, an ink set, an image forming apparatus, and an image forming method.

2. Background Art

The image density of an image is low when the image is formed on plain paper with an aqueous pigment ink discharged thereonto.

In attempts to solve this issue, a method has been introduced in which a pre-processing fluid is applied before an aqueous pigment ink is discharged.

However, a pre-processing fluid involves a problem of uneven coloring because the fluid has low level of wettability and defoambility.

A pre-processing fluid is known to improve these levels, which contains N-alkyl-2-pyrolidone, a fluorine-containing surfactant, and an acid or polyvalent metal salt. Materials having alkyl groups with 8 to 11 carbon atoms are used for N-alkyl-2-pyrolidone. In addition, for the fluorine-containing surfactant, compounds are used which are represented by a chemical formula: $C_nF_{2n+1}$—$CH_2CH(OH)CH_2O$—$(CH_2CH_2O)_a$—Y, where n represents an integer of from 2 to 6, a represents an integer of from 15 to 50, Y represents a group represented by a chemical formula: —$C_bH_{2b+1}$, where b represents an integer of from 11 to 19 or a chemical formula: —$CH_2CH(OH)CH_2$—$C_mF_{2m+1}$, where m represents an integer of from 2 to 6, with a Hydrophile-Lipophile Balance (HLB) value of from 10 to 16 according to William C. Griffin.

However, subduing occurrence of uneven coloring is further demanded

SUMMARY

The present invention provides an improved processing fluid which contains water, a water soluble organic solvent, a water soluble flocculant, a compound represented by $C_6F_{13}$—$CH_2CH_2O(CH_2CH_2O)_nH$ Chemical formula 1, where n represents an integer of from 1 to 40, and a compound represented by $HOR_1R_3C$—$(CH_2)_m$—$CR_2R_4OH$ Chemical formula 2, where $R_1$ and $R_2$ each, independently represent alkyl groups having 3 to 6 carbon atoms, $R_3$ and $R_4$ each, independently represent methyl groups or ethyl groups, and m represents an integer of from 1 to 6.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
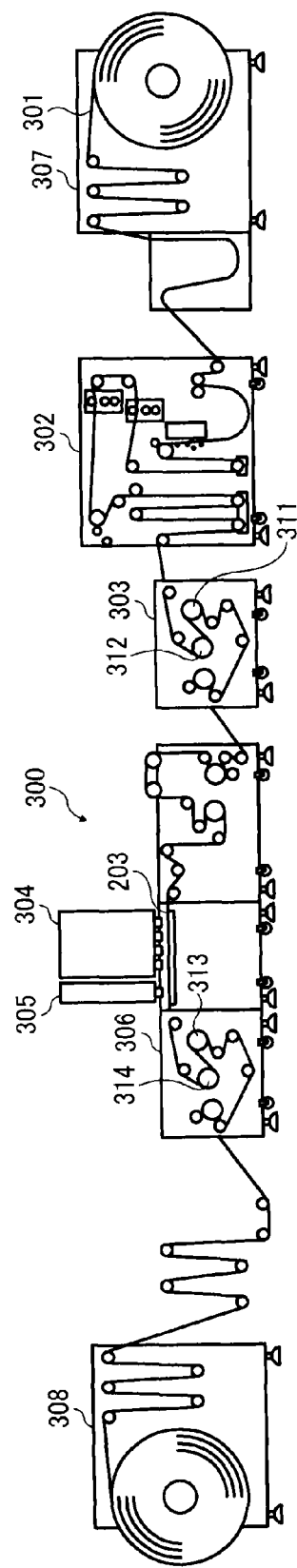
FIG. 1 is a schematic diagram illustrating an image forming apparatus according to an embodiment of the present invention.

Embodiments of the present disclosure are described with reference to accompanying drawings.

One of the embodiments of the present disclosure is a pre-processing fluid which contains water, a water soluble organic solvent, a water soluble flocculant, a compound represented by $C_6F_{13}$—$CH_2CH_2O(CH_2CH_2O)_nH$ Chemical formula 1, where n represents an integer of from 1 to 40, and a compound represented by $HOR_1R_3C$—$(CH_2)_m$—$CR_2R_4OH$ Chemical formula 2, where $R_1$ and $R_2$ each, independently represent alkyl groups having 3 to 6 carbon atoms, $R_3$ and $R_4$ each, independently represent methyl groups or ethyl groups, and m represents an integer of from 1 to 6.

Since the pre-processing fluid has excellent wettability to an application roller and a recording medium, which are described later, the pre-processing fluid can be evenly applied to the recording medium. In addition, the pre-processing fluid also has excellent defoamability, so that when foams appear at the rotation of the application roller, it is possible to minimize the impact of the foams.

As a result, uneven coloring is subdued.

Since the pre-processing fluid contains the compound represented by Chemical formula 1, the surface tension lowers, thereby improving the wettability to the application roller and the recording medium.

In Chemical formula 1, n is preferably an integer ranging from 6 to 30.

In Chemical formula 1, the perfluoroalkyl group ($C_6F_{13}$) preferably has a straight chain. For this reason, wettability to the application roller and the recording medium is further improved.

Specific examples of the compounds represented by Chemical formula 1 having different distributions of n available on market include, but are not limited to, CAPSTONE® FS-3100, FS-30, FS-31, FS-34, and FS-35 (manufactured by E. I. du Pont de Nemours and Company). These can be used alone or in combination.

Incidentally, the distribution of n of the compound represented by Chemical formula 1 can be measured by Nuclear Magnetic Resonance (NMR) or Mass Spectrometry.

The content of the compound represented by Chemical formula 1 in the pre-processing fluid is from 0.01% by weight to 1% by weight and preferably from 0.05% by weight to 0.5% by weight. Since the pre-processing fluid contains the compound represented by Chemical formula 1 in the pre-processing fluid in an amount of 0.01% by weight or more, the surface tension of the pre-processing fluid furthermore lowers, thereby furthermore improving wettability to the application roller and the recording medium. Since the pre-processing fluid contains the compound represented by Chemical formula 1 in the pre-processing fluid in an amount of 1% by weight or less, the solubility of the compounds represented by Chemical formula 1 is improved.

The pre-processing fluid optionally contains surfactants other than the compounds represented by Chemical formula 1.

If such surfactants are contained, the content of the compound represented by Chemical formula 1 in the total content of the surfactants is 60% by weight or more.

There is no specific limit to the selection of the surfactants other than the compound represented by Chemical formula 1. Examples thereof are anionic surfactants, cationic surfactants, nonionic surfactants, amphoteric surfactants, and fluorine-containing surfactants, and acetyleneglycol-based surfactants.

A specific example of the nonionic surfactants available on market is Mapomase PT (manufactured by Matsumoto Yushi-Seiyaku Co., Ltd.).

A specific example of the anionic surfactants available on market is ECTD-3NEX (manufactured by Nikko Chemicals Co., Ltd.).

A specific example of the acetyleneglycol-based surfactants available on market is Surfynol® 104PA (manufactured by Air Products and Chemicals, Inc.).

Specific examples of the fluorine containing surfactants available on market include, but are not limited to, Zonyl® FS-300, FSN, FSN-100, FSO, FSO-100, and FSH (all manufactured by E. I. du Pont de Nemours and Company) and DSN-403N (manufactured by Daikin Industries).

Since the pre-processing fluid contains the compound represented by Chemical formula 2, defoamability is improved.

The compound represented by Chemical formula 2 is preferably 2,4,7,9-tetramethyl-4,7-decane diol.

The content of the compound represented by Chemical formula 2 in the pre-processing fluid is from 0.1% by weight to 0.5% by weight and preferably from 0.2% by weight to 0.4% by weight. Since the content of the compound represented by Chemical formula 2 in the pre-processing fluid is 0.1% by weight or more, the defoamability of the pre-processing fluid is furthermore improved. Since the pre-processing fluid contains the compound represented by Chemical formula 2 in the pre-processing fluid in an amount of 0.5% by weight or less, the solubility of the compounds represented by Chemical formula 2 is improved.

Since the pre-processing fluid contains a water soluble flocculant, the pigment in an aqueous pigment ink agglomerates on the surface of a recording medium, thereby being capable of forming images with high image density.

There is no specific limit to the flocculant except that the pigment in an aqueous pigment ink can be flocculated on the surface of a recording medium. Examples thereof are water soluble aliphatic organic acids and water soluble metal salts. These can be used alone or in combination.

Specific examples of the water soluble aliphatic organic acids include, but are not limited to, succinic acid, citric acid, malic acid, tartaric acid, and lactic acid. Of these, tartaric acid and lactic acid are preferable.

There is no specific limit to the selection of the metal ion of the water soluble metal salts. Specific examples thereof include, but are not limited to, polyvalent metal ions such as aluminum ion, barium ion, calcium ion, copper ion, iron ion, magnesium ion, manganese ion, nickel ion, tin ion, titanium ion, and zinc ion. Of these, calcium ion and magnesium ion are preferable.

There is no specific limit to the selection of counter ions to the metal ions of the water soluble metal salts. Specific examples thereof include, but are not limited to, inorganic acid ions such as chloride ion, ionide ion, sulfuric acid ion, nitric acid ion, phsophoric acid ion, and thiocyanic acid ion, and organic acid ions such as acetic acid ion, oxalic acid ion, lactic acid ion, fumaric acid ion, citric acid ion, salicylic acid ion, and benzoic acid ion. Of these, chloride ion and sulfuric acid ion are preferable.

The content of the water soluble flocculant in the pre-processing fluid is from 0.1% by weight to 30% by weight and preferably from 1% by weight to 20% by weight. When the content of the water soluble flocculant in the pre-processing fluid is 0.1% by weight or more, images with higher image density are formed. To the contrary, when the content of the water soluble flocculant in the pre-processing fluid is 30% by weight or less, the solubility of the flocculant is improved.

There is no specific limit to the selection of the water soluble organic solvents.

Specific example of the water soluble organic solvent include, but are not limited to, polyols such as ethylene glycol, diethylene glycol, triethylene glycol, tetraethylene glycol, polyethylene glycol, propylene glycol, 1,3-butanediol, 1,3-propane diol, 2-methyl-1,3-propane diol, 1,4-butanediol, 1,5-pentanediol, 1,6-hexanediol, glycerin, 1,2,6-hexane triol, 2-ethyl-1,3-hexanediol, 1,2,4-butanetriol, 1,2,3-butanetriol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, and propylene glycol monoethyl ether; polyol aryl ethers such as ethylene glycol monophenyl ether, and ethylene glycol monobenzyl ether; nitrogen-containing heterocyclic compounds such as N-methyl-2-pyrolidone, N-hydroxyethyl-2-pyrolidone, 1,3-dimethyl imidazolidinone, and $\epsilon$-caprolactam; amides such as formamide, N-methylformamide, and N,N-dimethylformamide; amines such as monoethanol amine, diethanol amine, triethanol amine, monoethyl amine, diethylamine, and triethyl amine; sulfur-containing compounds such as dimethyl sulfoxide, sulfolane, and thiodiethanol; propylene carbonate, $\gamma$-butylolactone, and ethylene carbonate. These can be used alone or in combination.

The pre-processing fluid optionally contains corrosion inhibitors, pH regulators, preservatives and fungicides, etc.

There is no specific limit to the selection of the corrosion inhibitors. Specific examples thereof include, but are not limited to, benzotriazole, acid sulfite, thiosodium sulfate, ammonium thiodiglycolate, diisopropyl ammonium nitrite, pentaerythritol tetranitrate, and dicyclohexyl ammonium nitrite.

There is no specific limit to the selection of the pH regulators. Specific examples thereof include, but are not limited to, hydroxides of alkali metals such as lithium hydroxide, sodium hydroxide, and potassium hydroxide; onium hydroxides such as ammonium hydroxide, hydroxides of quaternary ammonium, and hydroxides of quaternary phosphonium; carbonates of alkali metals such as lithium carbonate, sodium carbonate, and potassium carbonate; amines such as diethanol amine and triethanol amine; acidum boricum, hydrochloric acid, nitric acid, sulfuric acid, and acetic acid.

There is no specific limit to the selection of the preservatives and fungicides. Specific examples thereof include, but are not limited, dehydrosodium acetate, sodium sorbinate, 2-pyridine thiol-1-oxide sodium, sodium benzoate, and pentachlorophenol sodium.

There is no specific limit to the selection of the application methods of pre-processing fluid that can evenly apply the pre-processing fluid.

Specific examples of the methods include, but are not limited to, blade coating method, gravure coating method, gravure offset coating method, bar code method, and roll coating method.

The pre-processing fluid can be applied to the entire recording area of a recording medium or the area to which an aqueous pigment ink is discharged.

There is no specific limit to the recording medium excluding inkjet special paper.

Specific examples thereof include, but are not limited to, plain paper, art paper, coated paper, light-weight coated paper, cast paper, and finely coated paper.

The aqueous pigment ink contains a pigment, a water soluble organic solvents, a surfactant, and water.

There is no specific limit to the selection of the pigment for black. A specific example thereof is aniline black.

There is no specific limit to the selection of the pigment for color. Specific examples of color pigments include, but are not limited to, anthraquinone, phthalocyanine blue, phthalocyanine green, dizao, monoazo, pyranthrone, perylene, heterocyclic type yellow, quinacridone, and (thio)indigoido. Of these, in terms of coloring, phthalocyanine-based pigments, quinacridone-based pigments, monoazo yellow pigments, diazo yellow-based pigments, and heterocyclic yellow pigments are preferable.

Specific examples of the phthalocyanine-based pigments include, but are not limited to, copper phthalocyanine blue and derivatives thereof (C.I. Pigment Blue 15:3 and C.I. Pigment Blue 15:4), and aluminum phthalocyanine.

Specific examples of the quinacridone-based pigments include, but are not limited to, C.I. Pigment Orange 48, C.I. Pigment Orange 49, C.I. Pigment Red 122, C.I. Pigment Red 192, C.I. Pigment red 202, C.I. Pigment Red 206, C.I. Pigment Red 207, C.I. Pigment Red 209, C.I. Pigment Violet 19, and C.I. Pigment Violet 42.

Specific examples of the monoazo yellow-based pigments include, but are not limited to, C.I. Pigment Yellow 74, C.I. Pigment Yellow 109, C.I. Pigment Yellow 128, and C.I. Pigment Yellow 151.

Specific examples of the diazo yellow-based pigments include, but are not limited to, C.I. Pigment Yellow 14, C.I. Pigment Yellow 16, and C.I. Pigment Yellow 17.

Specific examples of the heterocyclic yellow pigments include, but are not limited to, Pigment Yellow 117 and Pigment Yellow 138.

The content of the pigment in the aqueous pigment ink is from 1% by weight to 20% by weight and preferably from 2% by weight to 15% by weight.

As the water soluble organic solvent for an aqueous pigment ink, the same water soluble organic solvents as for the pre-processing fluid can be used. These can be used alone or in combination.

The aqueous pigment ink optionally contains sugar groups and derivatives thereof.

There is no specific limit to the selection of the sugar group. Specific examples thereof include, but are not limited to, monosaccharides, disaccharides, oligosaccharides (including trisaccharides and tetrasaccharides), and polysaccharides.

Specific examples thereof include, but are not limited to, glucose, mannose, fructose, ribose, xylose, trehalose, and maltotriose.

Polysaccharides represent sugar in a broad sense and contain α-cyclodextrine, cellulose, etc.

There is no specific limit to the selection of the derivatives of the sugar groups.

Specific examples thereof include, but are not limited to, reducing sugars and acidizing sugars. Of these, sugar alcohols such as maltitol and sorbid are preferable.

The content of the sugar group in the aqueous pigment ink is from 0.1% by weight to 40% by weight and preferably from 0.5% by weight to 30% by weight.

There is no particular limit to the surfactant. Specific examples thereof include, but are not limited to, anionic surfactants, nonionic surfactants, and amphoteric surfactants. These can be used alone or in combination. Of these, in terms of low surface tension and high leveling property, fluorine-containing surfactants and silicone-based surfactants are preferable and fluorine-containing surfactants are more preferable.

Specific examples of the anionic surfactants include, but are not limited to, polyoxyethylene alkylether acetates, dodecyl benzene sulfonates, succinic acid ester sulfonates, laurates, and polyoxyethylene alkylether sulfates.

Specific examples of the nonionic surfactants include, but are not limited to, acetylene glycol-based surfactants, polyoxyethylene alkyl ethers, polyoxyethylene alkylphenyl ethers, polyoxyethylene alkylesters, and polyoxyethylene sorbitane aliphatic acid esters.

Specific examples of acetylene glycol-based surfactants include, but are not limited to, 2,4,7,9-tetramethyl-5-desine-4,7-diol, 3,6-dimethyl-4-octine-3,6-diol, and 3,5-dimethyl-1-hexine-3-ol.

A specific example of the acetyleneglycol-based surfactants available on market is Surfynol® 104, 82, 465, 485, and TG (manufactured by Air Products and Chemicals, Inc.).

Specific examples of amphoteric surfactants include, but are not limited to, lauryl amino propionic acid salts, lauryl dimethyl betaine, steallyldimethylbetaine, lauryl dihydroxyethyl betaine, lauryldimethyl amineoxide, myristyl dimethylamine oxide, stearyldimethylamine oxide, dihydroethyl lauryl amineoxide, polyoxyethylene palm oil alkyldimethyl amineoxide, dimethylalkyl (palm) betaine, and dimethyl laurylbetaine.

Specific examples of the fluorine-containing surfactants include, but are not limited to, perfluoroalkyl sulfonic acid compounds and salts thereof, perfluoroalkyl carboxylic acid compounds and salts thereof, perfluoroalkyl phosphoric acid ester compounds and salts thereof, adducts of perfluoroalkyl ethylene oxide, sulfonic acid ester salts of polyoxyalkylene ether polymer having a perfluoroalkoxy group in its side chain and salts of polyoxyalkylene ether polymer having a perfluoroalkoxy group in its side chain.

Specific examples of counter ions of fluorine-containing surfactants include, but are not limited to, $Li^+$, $Na^+$, $K^+$, $NH_{4+}$, $^+NH_3(CH_2CH_2OH)$, $^+NH_2(CH_2CH_2OH)_2$, and $^+NH(CH_2CH_2OH)_3$.

Specific examples of the fluorine-containing surfactants available on market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.), FLUORAD FC-93, FLUORAD FC-95, FLUORAD FC-98, FLUORAD FC-129, FLUORAD FC-135, FLUORAD FC-170C, FLUORAD FC-430, and FLUORAD FC-431 (all manufactured by SUMITOMO 3M), MEGAFACE F-470, MEGAFACE F-1405, and MEGAFACE F-474 (all manufactured by DIC CORPORATION); ZONYL TBS, FSP, FSA, FSN-100, FSN, FSO-100, FSO, FS-300 UR (all manufactured by E. I. du Pont de Nemours and Company), FT-110, FT-250, FT-251, FT-252, FT-400S, FT-150, and FT-400SW (all manufactured by NEOS COMPANY LIMITED), and PF-151N (manufactured by OMNOVA SOLUTIONS INC.)

There is no specific limit to the selection of such silicone-based surfactants.

Specific examples thereof include, but are not limited to, side chain-modified polydimethyl siloxane, both end-modified polydimethyl siloxane, one end-modified polydimethyl siloxane, and side chain both end-modified polydimethyl siloxane.

The modifying group is preferably polyoxyethylene group or polyoxyethylene polyoxypropylene group.

It is also possible to use a polyether-modified silicone-based surfactant as the silicone-based surfactant.

A specific example of the polyether-modified silicone-based surfactant is a compound in which a polyalkylene group is introduced into the side chain of dimethyl siloxane.

Specific examples of the polyether-modified silicone-containing surfactants available on market include, but are not limited to, KF-618, KF-642, and KF-643 (manufactured by Shin-Etsu Chemical Co., Ltd.).

The content of the surfactant in the aqueous pigment ink is from 0.01% by weight to 3% by weight and preferably from 0.5% by weight to 2% by weight.

The aqueous pigment ink preferably contains resin particles having carboxylic groups. Therefore, an aqueous flocculant contained in the pre-processing fluid reacts with the resin particles having carboxylic groups and thereafter the pigment flocculates on a recording medium, resulting in further increasing of image density.

There is no specific limit to the selection of the resin particles having carboxylic groups.

Specific examples thereof include, but are not limited to, maleic acid resin particles, styrene-maleic acid resin particles, rosin-modified maleic acid resin particles, alkyd resin particles, and modified alkyd resin particles.

Specific examples of the resin particles having carboxylic groups available on market include, but are not limited to, MALKYD™ (manufactured by Arakawa Chemical Industries, Ltd.) and HARIMACK and HARIPHTHAL (both manufactured by Harima Chemicals Group, Inc.).

Therefore, the minimum film-forming temperature (MFT) of the resin particles having carboxyl groups is 30° C. or lower and preferably 10° C. or lower.

The volume average particle diameter of the resin particles having carboxyl groups is from 5 nm to 200 nm and preferably from 10 nm to 100 nm.

The content of the resin particles having carboxyl groups in an aqueous pigment ink is from 0.5% by weight to 20% by weight and preferably from 1% by weight to 5% by weight.

The resin particles having carboxyl groups can be added in a form in which pigments are encapsulated or in which no pigments are encapsulated.

The aqueous pigment ink optionally contains a pH regulator, a preservatives and fungicides, and a corrosion inhibitor.

The pH of the aqueous pigment ink is from 9 to 11.

There is no specific limit to the selection of the pH regulators. Specific examples thereof include, but are not limited to, hydroxides of alkali metals such as lithium hydroxide, sodium hydroxide, and potassium hydroxide; onium hydroxides such as ammonium hydroxide, hydroxides of quaternary ammonium, and hydroxides of quaternary phosphonium; carbonates of alkali metals such as lithium carbonate, sodium carbonate, and potassium carbonate; amines such as diethanol amine and triethanol amine; acidum boricum, hydrochloric acid, nitric acid, sulfuric acid, and acetic acid.

There is no specific limit to the selection of the preservatives and fungicides. Specific examples thereof include, but are not limited, dehydrosodium acetate, sodium sorbinate, 2-pyridine thiol-1-oxide sodium, sodium benzoate, and pentachlorophenol sodium.

There is no specific limit to the selection of the corrosion inhibitors. Specific examples thereof include, but are not limited to, benzotriazole, acid sulfite, thiosodium sulfate, ammonium thiodiglycolate, diisopropyl ammonium nitrite, pentaerythritol tetranitrate, and dicyclohexyl ammonium nitrite.

It is preferable to form images using an ink set containing the pre-processing fluid and an aqueous pigment ink because images having a high image density can be formed while occurrence of uneven coloring is subdued.

Moreover, images can be formed by an image forming method including a step of applying the pre-processing fluid to a recording medium and a step of discharging an aqueous pigment ink to the surface of the recording medium to which the pre-processing fluid is already applied.

FIG. 1 is a schematic diagram illustrating an example of an image forming apparatus.

An image forming apparatus 300 includes a recording medium transfer unit 301, a pre-processing unit 302 to apply a pre-processing fluid to a recording medium 203, a drying unit 303 to dry the recording medium 203 to which the pre-processing fluid is already applied, an inkjet recording unit 304 to form an image on the dried recording medium 203 by discharging an aqueous pigment ink thereto, a post-processing unit 305 to apply a post-processing fluid to the recording medium 203 after the image is formed thereon, and a second drying unit 306 to dry the recording medium 203 to which the post-processing fluid is already applied.

The recording medium transfer unit 301 has a sheet feeder 307, multiple transfer rollers, and a reeling unit 308. The recording medium 203, which is continuous roll paper, is reeled out from the sheet feeder 307 by the transfer rollers, and thereafter reeled up by the reeling unit 308.

The recording medium 203 transferred from the recording medium transfer unit 301 is coated with the pre-processing fluid by the pre-processing fluid application unit 204 (illustrated in FIG. 2) of the pre-processing unit 302.

Figure 2:
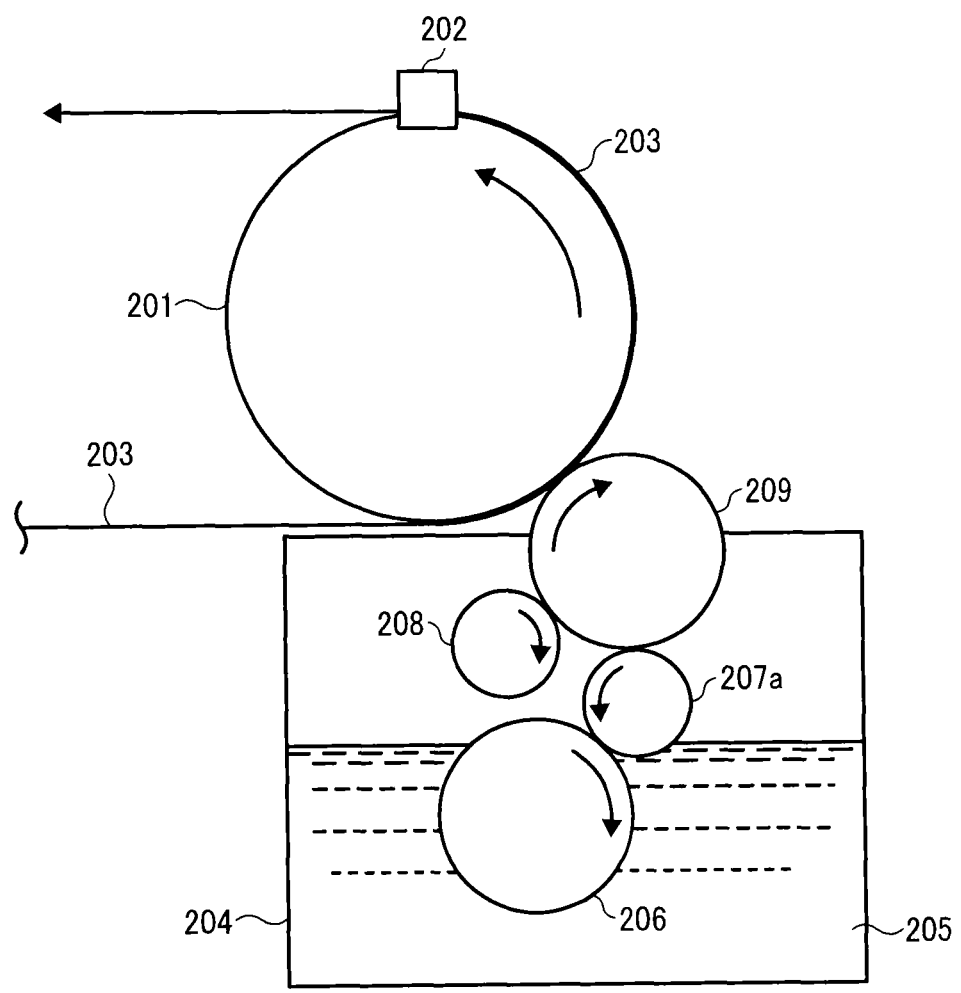
FIG. 2 is a schematic diagram illustrating a pre-processing fluid application device of the pre-processing unit illustrated in FIG. 1.

As illustrated in FIG. 2, a pre-processing fluid 205 is accommodated inside the pre-processing fluid application unit 204. In this unit, a thin film of the pre-processing fluid 205 is formed on the surface of an application roller 209 by a stirring and supplying roller 206, a conveying roller 207, and a thin film forming roller 208. Thereafter, the application roller 209 rotates while being pressed against a rotatable counter roller 201 and the pre-processing fluid 205 is applied to the surface of the recording medium 203 while the recording medium 203 passes between the application roller 209 and the rotatable counter roller 201. At this timing, a pressure controller 202 adjusts the nip pressure between the counter roller 201 and the application roller 209 to control the application amount of the pre-processing fluid 205. In addition, by controlling the rotation speed of the counter roller 201 and the application roller 209, the application amount of the pre-processing fluid 205 can be adjusted. The application roller 209 and the counter roller 201 are driven by a power supply such as drive motor. The rotation speed of the application roller 209 and the counter roller 201 can be controlled by adjusting the energy of the power supply.

By using the application roller 209 to apply the pre-processing fluid 205 to the recording area of the recording medium 203, the pre-processing fluid 205 having a relatively high viscosity can be thinly applied to the recording medium 203 to further subdue occurrence of uneven coloring.

The application method in the pre-processing unit 302 is not limited to the roll coating method. Other specific methods are, for example, blade coating method, gravure coating method, gravure offset coating method, bar code method, and roll coating method.

The pre-processing fluid 205 can be applied to the entire recording area of the recording medium 203 or only the area to which an image is formed.

The recording medium 203 to which the pre-processing fluid 205 is already applied is dried by heat rollers 311 and 312 of the drying unit 303. This unit conveys the recording medium 203 to which the pre-processing fluid 205 is applied to the heat rollers 311 and 312 by the transfer rollers. The heat rollers 311 and 312 are heated to high temperatures from 50° C. to 100° C. The moisture of the recording medium 203 to which the post-processing fluid 205 is already applied evaporates by contact heat transfer from the heat rollers 311 and 312 so that the recording medium 203 becomes dry.

The drying unit in the first drying unit 303 is not limited to a heat roller. Other examples are an infra red drier, a microwave drier, a heat wind drier. These can be used alone or in combination.

Optionally, it is also possible to heat the recording medium 203 before the pre-processing fluid 205 is applied.

On the thus-dried recording medium 203, an image is formed by the inkjet recording unit 304 in response to image data.

The inkjet recording unit 304 is a full-line type head including four inkjet heads 304K, 304C, 304M, and 304Y of black K, cyan C, magenta M, and yellow Y, respectively, arranged in this order from upstream of the transfer direction of the recording medium 203.

Figure 3:
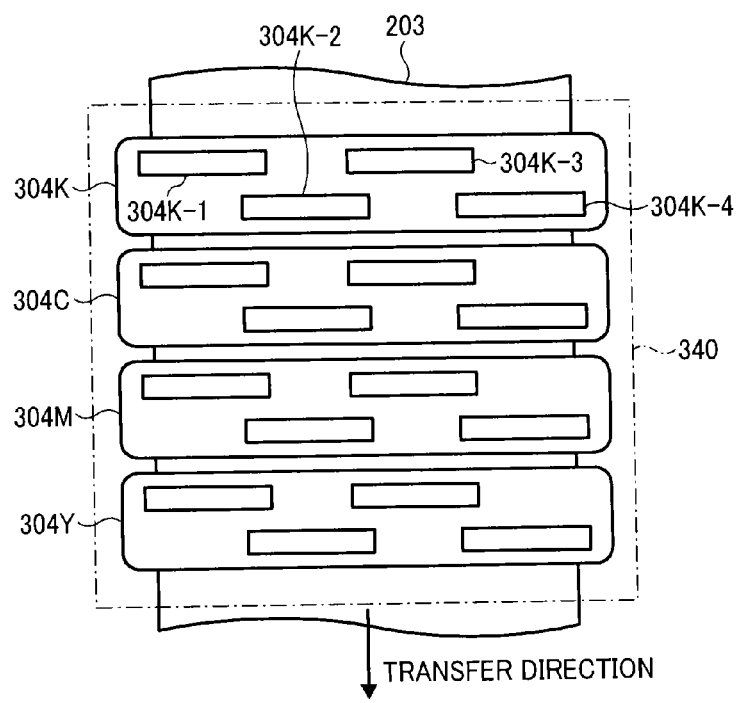
FIG. 3 is a schematic diagram illustrating an inkjet head of the inkjet recording unit illustrated in FIG. 1.
Figure 4:
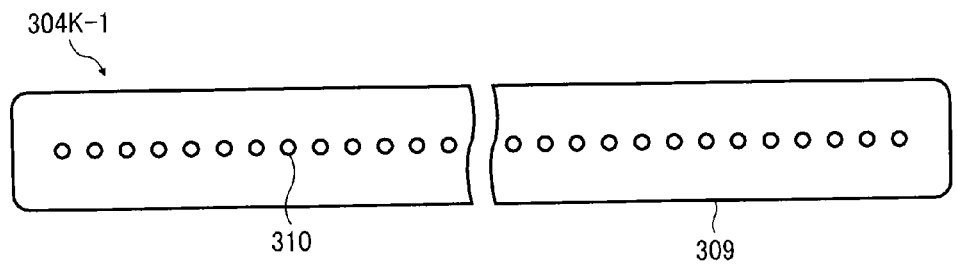
FIG. 4 is an enlarged view illustrating the head unit illustrated in FIG. 3.

As illustrated in FIG. 3, the inkjet head 304K has four head units of 304K-1, 304K-2, 304K-3, and 304K-4 arranged zig-zag along the direction perpendicular to the transfer direction of the recording medium 203 to secure the recording area width of the recording medium 203. As illustrated in FIG. 4, a nozzle surface 309 of the head unit 304K-1 has multiple print nozzles 310 arranged along the longitudinal direction of the head unit 304K-1 to form a nozzle array.

The nozzle array can be multiple.

The other heads 304C, 304M, and 304Y have the same configurations and the four inkjet heads 304K, 304C, 304M, and 304Y are arranged along the transfer direction spaced the same distance therebetween. For this reason, an image can be formed on the whole width of the entire recording area by a single recording operation.

Optionally, a post-processing fluid is applied by the post-processing unit 305 to the recording medium 203 on which an image is formed.

The post-processing fluid forms a transparent protective layer on the recording medium 203 on which an image is formed.

The post-processing fluid can be applied to the entire recording area of the recording medium 203 or only the area to which an image is formed.

The recording medium 203 on which an image is formed or the recording medium 203 to which the post-processing fluid is applied is dried by heat rollers 313 and 314 of the second drying unit 306 in the same manner as in the first drying unit 303.

The dried recording medium 203 is reeled up by the reeling unit 308.

It is optional to provide a prior-to-reeling drying unit to dry the recording medium 203 before the recording medium 203 is reeled up by the reeling unit 308.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Preparation of Dispersion Element of Cyan Pigment

After replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethlene glycol methacrylate, 4.0 g of styrene macromer (AS-6, manufactured by TOA GOSEI CO., LTD.), and 0.4 g of mercapto ethanol were charged in the flask followed by heating the system to 65° C. Thereafter, a liquid mixture of 100.8 g of styrene, 25.2 g of acrylic acid, 108.0 g of lauryl methacrylate, 36.0 g of polyethylene glycol methacrylate, 60.0 g of 2-hydroxyethyl methacrylate, 36.0 g of styrene macromer (AS-6, manufactured by TOA GOSEI CO., LTD.), 3.6 g of mercapto ethanol, 2.4 g of azobisdimethyl valeronitrile, and 18 g of methylethyl ketone was dripped to the flask in two and a half hours. Furthermore, a liquid mixture of 0.8 g of azobis dimethyl valeronitrile and 18 g of methylethyl ketone was dripped in half an hour.

After one-hour aging at 65° C., 0.8 g of azobisdimethyl valeronitrile was added followed by another one-hour aging. Thereafter, 364 g of methylethyl ketone was added to the flask to obtain 800 g of a 50% by weight polymer solution.

After a part of the polymer solution was dried, the weight average molecular weight thereof was 15,000 as measured by gel permeation chromatography. Polystyrene was used as reference material and tetrahydrofuran was used as eluent.

After 28 g of this polymer solution, 26 g of copper phthalocyanine, 13.6 g of 1 mol/L potassium hydroxide solution, 20 g of methylethyl ketone, and 30 g of deionized water were sufficiently stirred, the mixture was mixed and kneaded 20 times using a three-roll mill (NR-84A, manufactured by Noritake Co.) to obtain a paste. The thus-obtained paste was charged in 200 g of deionized water. Subsequent to sufficient stirring, methylethyl ketone and water were distilled away using an evaporator to obtain 160 g of a dispersion element of cyan pigment having a solids content of 20% by weight.

The volume average particle diameter of the dispersion element of cyan pigment was 98 nm as measured by Microtrac UPA (manufactured by MicrotracBEL).

Preparation of Magenta Pigment Dispersion Element

A dispersion element of magenta pigment was obtained in the same manner as in the preparation of the dispersion element of cyan pigment except that Pigment Red 122 was used instead of copper phthalocyanine.

The volume average particle diameter of the dispersion element of magenta pigment was 124 nm as measured by Microtrac UPA (manufactured by MicrotracBEL).

Preparation of Dispersion Element of Yellow Pigment

A dispersion element of yellow pigment was obtained in the same manner as in the preparation of the dispersion element of cyan pigment except that Pigment Yellow 74 was used instead of copper phthalocyanine.

The volume average particle diameter of the dispersion element of yellow pigment was 78 nm as measured by Microtrac UPA (manufactured by MicrotracBEL).

Preparation of Dispersion Element of Black Pigment

A dispersion element of black pigment was obtained in the same manner as in the preparation of the dispersion element of cyan pigment except that Carbon black FW100 (manufactured by Degussa AG) was used instead of copper phthalocyanine.

The volume average particle diameter of the dispersion element of black pigment was 110 nm as measured by Microtrac UPA (manufactured by MicrotracBEL).

Preparation of Aqueous Cyan Pigment Ink 20 parts of the dispersion element of cyan pigment, 23 parts by 1,3-butanediol, 8 parts of glycerin, 2 parts of 2-ethyl-1,3-hexanediol, 1 part of fluorine-containing nonionic surfactant having an effective component of 40% by weight (Zonyl FS-300: polyoxyethylene perfluoro alkylether, manufactured by E. I. du Pont de Nemours and Company), 0.2 parts of preservatives and fungicides (PROXEL LV: 1,2-benzoisothiazoline-3-on, manufactured by Avecia), 0.3 parts of 2-amino-2-ethyl-1,3-propane diol, and 45.5 parts of deionized water were mixed to obtain an aqueous cyan pigment ink.

Preparation of Aqueous Magenta Pigment Ink 20 parts of the dispersion element of magenta pigment, 22.5 parts of 1,3-butanediol, 9 parts of glycerin, 2 parts of 2-ethyl-1,3-hexanediol, 1 part of fluorine-containing nonionic surfactant having an effective component of 40% by weight (Zonyl FS-300: polyoxyethylene perfluoro alkyl ether, manufactured by E. I. du Pont de Nemours and Company), 0.2 parts of preservatives and fungicides (PROXEL LV: 1,2-benzoisothiazoline-3-on, manufactured by Avecia), 0.3 parts of 2-amino-2-ethyl-1,3-propane diol, and 45 parts of deionized water were mixed to obtain an aqueous magenta pigment ink.

Preparation of Aqueous Yellow Pigment Ink 20 parts of the dispersion element of yellow pigment, 24.5 parts by 1,6-hexanediol, 8 parts of glycerin, 2 parts of 2-ethyl-1,3-hexanediol, 0.5 parts of fluorine-containing nonionic surfactant having an effective component of 40% by weight (Zonyl FS-300: polyoxyethylene perfluoro alkyl ether, manufactured by E. I. du Pont de Nemours and Company), 0.2 parts of preservatives and fungicides (PROXEL LV: 1,2-benzoisothiazoline-3-on, manufactured by Avecia), 0.3 parts of 2-amino-2-ethyl-1,3-propane diol, and 44.5 parts of deionized water were mixed to obtain an aqueous yellow pigment ink.

Preparation of Aqueous Black Pigment Ink 20 parts of the dispersion element of black pigment, 22.5 parts of 1,5-pentanediol, 7.5 parts of glycerin, 2 parts of 2-pyrolidone, 0.5 parts of fluorine-containing nonionic surfactant having an effective component of 30% by weight (Zonyl FS-300: polyoxyethylene perfluoro alkyl ether, manufactured by E. I. du Pont de Nemours and Company), 0.1 parts of fluorosilicone-based defoaming agent (FA-630, manufactured by Shin-Etsu Chemical Co., Ltd.), 0.2 parts of preservatives and fungicides (PROXEL LV: 1,2-benzoisothiazoline-3-on, manufactured by Avecia), 0.5 parts of 2-amino-2-ethyl-1,3-propane diol, and 46.7 parts of deionized water were mixed to obtain an aqueous black pigment ink.

Example 1

10 parts of lactic acid, 13.2 parts of 2-amino-2-ethyl-1,3-propane diol, 10 parts of 1,3 butanediol, 10 parts of glycerin, 2 parts of 2-ethyl-1,3-hexanediol, 0.1 parts of fluorine-containing nonionic surfactant (Capstone™ FS-3100, manufactured by E. I. du Pont de Nemours and Company), 0.4 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole), and 54 parts of deionized water were mixed to obtain a pre-processing fluid.

The pre-processing fluid was colorless and transparent.

Incidentally, fluorine-containing nonionic surfactant (Capstone™ FS-3100, manufactured by E. I. du Pont de Nemours and Company) are compounds represented by Chemical formula 1 with an n of from 7 to 17.

Example 2

10 parts of lactic acid, 13.2 parts of 2-amino-2-ethyl-1,3-propane diol, 10 parts of 3-methyl-1,3-hexanediol, 10 parts of glycerin, 2 parts of 2,2,4-trimethyl-1,3-pentanediol, 0.2 parts of fluorine-containing nonionic surfactant (Capstone™ FS-3100, manufactured by E. I. du Pont de Nemours and Company), 0.5 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole), and 53.8 parts of deionized water were mixed to obtain a pre-processing fluid.

The pre-processing fluid was colorless and transparent.

Example 3

10 parts of acidum tartaricum, 8 parts of 2-amino-2-ethyl-1,3-propane diol, 10 parts of 1,3 butanediol, 10 parts of 3-methyl-1,3-hexanediol, 2 parts of 2-ethyl-1,3-hexanediol, 0.3 parts of fluorine-containing nonionic surfactant (Capstone™ FS-34, manufactured by E. I. du Pont de Nemours and Company), 0.3 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole), and 59.1 parts of deionized water were mixed to obtain a pre-processing fluid.

The pre-processing fluid was colorless and transparent.

Incidentally, the fluorine-containing nonionic surfactant (Capstone™ FS-34, manufactured by E. I. du Pont de Nemours and Company) are compounds represented by Chemical formula 1 with an n of from 5 to 20.

Example 4

10 parts of acidum tartaricum, 8 parts of 2-amino-2-ethyl-1,3-propane diol, 10 parts of 1,3-butanediol, 10 parts of glycerin, 2 parts of 2,2,4-trimethyl-1,3-pentanediol, 0.1 parts of fluorine-containing nonionic surfactant (Capstone™ FS-30, manufactured by E. I. du Pont de Nemours and Company), 0.1 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole), and 59.5 parts of deionized water were mixed to obtain a pre-processing fluid.

The pre-processing fluid was colorless and transparent.

Incidentally, the fluorine-containing nonionic surfactant (Capstone™ FS-30, manufactured by E. I. du Pont de Nemours and Company) are compounds represented by Chemical formula 1 with an n of from 6 to 22.

Example 5

10 parts of magnesium sulfate, 10 parts of 3-methyl-1,3-hexanediol, 10 parts of glycerin, 2 parts of 2-ethyl-1,3-hexanediol, 0.05 parts of fluorine-containing nonionic surfactant (Capstone™ FS-30, manufactured by E. I. du Pont de Nemours and Company), 0.25 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2, 3-benzotriazole), and 67.4 parts of deionized water were mixed to obtain a pre-processing fluid.

The pre-processing fluid was colorless and transparent.

Example 6

10 parts of magnesium sulfate, 10 parts of 1,3-butanediol, 10 parts of glycerin, 2 parts of 2,2,4-trimethyl-1,3-pentanediol, 0.75 parts of fluorine-containing nonionic surfactant (Capstone™ FS-34, manufactured by E. I. du Pont de Nemours and Company), 0.5 parts of EnviroGem™ AD-01 (2,4, 7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2, 3-benzotriazole), and 66.45 parts of deionized water were mixed to obtain a pre-processing fluid.

The pre-processing fluid was colorless and transparent.

Example 7

10 parts of magnesium sulfate, 10 parts of 1,3-butanediol, 10 parts of glycerin, 2 parts of 2-ethyl-1,3-hexanediol, 0.01 parts of fluorine-containing nonionic surfactant (Capstone™ FS-3100, manufactured by E. I. du Pont de Nemours and Company), 0.3 part of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole), and 67.39 parts of deionized water were mixed to obtain a pre-processing fluid The pre-processing fluid was colorless and transparent.

Example 8

10 parts of calcium chloride, 10 parts of 3-methyl-1,3-hexanediol, 10 parts of glycerin, 2 parts of 2-ethyl-1,3-hexanediol, 0.5 parts of fluorine-containing nonionic surfactant (Capstone™ FS-3100, manufactured by E. I. du Pont de Nemours and Company), 0.5 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole), and 66.7 parts of deionized water were mixed to obtain a pre-processing fluid.

The pre-processing fluid was colorless and transparent.

Example 9

A pre-processing fluid was obtained in the same manner as in Example 1 except that the fluorine-containing nonionic surfactant (Capstone™ FS-30, manufactured by E. I. du Pont de Nemours and Company) was used instead of the fluorine-containing nonionic surfactant (Capstone™ FS-3100, manufactured by E. I. du Pont de Nemours and Company).

The pre-processing fluid was colorless and transparent.

Example 10

A pre-processing fluid was obtained in the same manner as in Example 1 except that the fluorine-containing nonionic surfactant (Capstone™ FS-34, manufactured by E. I. du Pont de Nemours and Company) was used instead of the fluorine-containing nonionic surfactant (Capstone™ FS-3100, manufactured by E. I. du Pont de Nemours and Company).

The pre-processing fluid was colorless and transparent.

Comparative Example 1

10 parts of lactic acid, 13.2 parts of 2-amino-2-ethyl-1,3-propane diol, 10 parts of 1,3 butanediol, 10 parts of glycerin, 2 parts of 2-ethyl-1,3-hexanediol, 0.5 parts of fluorine-containing nonionic surfactant (Capstone™ FS-3100, manufactured by E. I. du Pont de Nemours and Company), 0.2 parts of preservatives and fungicides (PROXEL™LV: 1,2-benzoisothiazoline-3-on, available from Avecia), 0.1 parts of corrosion inhibitor (1,2,3-benzotriazole) and 54 parts of deionized water were mixed to obtain a pre-processing fluid.

The pre-processing fluid was colorless and transparent.

Comparative Example 2 parts of acidum tartaricum, 8 parts of 2-amino-2-ethyl-1, 3-propane diol, 10 parts of 1,3-butanediol, 10 parts of glycerin, 2 parts of 2,2,4-trimethyl-1,3-pentanediol, 0.5 parts of nonionic surfactant (UNISAFE A-LY: polyoxyethylene palm oil alkyldimethyl amine oxide, manufactured by NOF CORPORATION), 0.5 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2, 3-benzotriazole) and 58.7 parts of deionized water were mixed to obtain a pre-processing fluid.

The pre-processing fluid was colorless and transparent.

Comparative Example 3

10 parts of acidum tartaricum, 8 parts of 2-amino-2-ethyl-1,3-propane diol, 10 parts of 1,3-butanediol, 10 parts of 3-methyl-1,3-hexanediol, 2 parts of 2-ethyl-1,3-hexanediol, 0.4 part of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole), and 59.3 parts of deionized water were mixed to obtain a pre-processing fluid.

The pre-processing fluid was slightly clouded.

Comparative Example 4

10 parts of acidum tartaricum, 8 parts of 2-amino-2-ethyl-1,3-propane diol, 10 parts of 1,3-butanediol, 10 parts of glycerin, 2 parts of 2,2,4-trimethyl-1,3-pentanediol, 1 part of anionic surfactant (ECTD-3NEX: polyoxyethylene (3) tridecylether sodium acetate, manufactured by Nikko Chemicals, Co., Ltd.), 0.5 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole) and 58.2 parts of deionized water were mixed to obtain a pre-processing fluid.

The pre-processing fluid was colorless and transparent.

Comparative Example 5

10 parts of magnesium sulfate, 10 parts of 3-methyl-1,3-hexanediol, 10 parts of glycerin, 2 parts of 2-ethyl-1,3-hexanediol, 0.5 parts of anionic surfactant (ECTD-3NEX: polyoxyethylene (3) tridecylether sodium acetate, manufactured by Nikko Chemicals, Co., Ltd.), 0.1 parts of fluorine containing surfactant (UNIDYNE DSN-403N: adduct of perfluoroalkyl ethylene oxide, manufactured by DAIKIN INDUSTRIES, ltd.), 0.4 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole), and 66.7 parts of deionized water were mixed to obtain a pre-processing fluid.

The pre-processing fluid was colorless and transparent.

Comparative Example 6

10 parts of magnesium sulfate, 10 parts by 1,3-butanediol, 10 parts of glycerin, 2 parts of 2,2,4-trimethyl-1,3-pentanediol, 0.5 parts of fluorine-containing nonionic surfactant having an effective component of 40% by weight (Zonyl FS-300: polyoxyethylene perfluoro alkyl ether, manufactured by E. I. du Pont de Nemours and Company), 0.2 parts of preservatives and fungicides (PROXEL LV: 1,2-benzoisothiazoline-3-on, manufactured by Avecia), 0.1 parts of corrosion inhibitor (1,2,3-benzotriazole), and 67.2 parts of deionized water were mixed to obtain an aqueous cyan pigment ink.

The pre-processing fluid was colorless and transparent.

Comparative Example 7

10 parts of calcium chloride, 10 parts of 1,3-butanediol, 10 parts of glycerin, 2 parts of 2-ethyl-1,3-hexanediol, 0.5 parts of anionic surfactant (ECTD-3NEX: polyoxyethylene (3) tridecylether sodium acetate, manufactured by Nikko Chemicals, Co., Ltd.), 0.5 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole) and 66.7 parts of deionized water were mixed to obtain a pre-processing fluid.

The pre-processing fluid was colorless and transparent.

Comparative Example 8

10 parts of calcium chloride, 10 parts of 3-methyl-1,3-hexanediol, 10 parts of glycerin, 1 part of nonionic surfactant (NOIGEN LP-100: polyoxyalkylene lauryl ether, manufactured by DKS Co. Ltd.), 0.3 parts of fluorine containing nonionic surfactant (Zonyl FS-300: polyoxyethylene perfluoroalkylether, manufactured by E. I. du Pont de Nemours and Company), 0.5 parts of EnviroGem™ AD-01 (2,4,7,9-tetramethyl-4,7-decane diol, manufactured by Nisshin Chemical Industry Co., Ltd.), 0.2 parts of preservatives and fungicides (PROXEL™LV: 1,2-benzoisothiazoline-3-on, available from Avecia), 0.1 parts of corrosion inhibitor (1,2,3-benzotriazole), and 67.9 parts of deionized water were mixed to obtain a pre-processing fluid.

The pre-processing fluid was colorless and transparent.

Next, the image density, uneven coloring, and defoamability of the pre-processing fluids of Examples 1 to 10 and Comparative Examples 1 to 8 wee evaluated.

Image Density

After applying the pre-processing fluid to plain paper (My-Paper, manufactured by Ricoh Company Ltd.) in a predetermined application manner, images were printed using an inkjet printer (IPSiO Gxe3300, manufactured by Ricoh Company Ltd.) At this point, using the aqueous yellow pigment ink, the aqueous magenta pigment ink, the aqueous cyan pigment ink, or the aqueous black pigment ink, the general symbols shown in the tables made by JIS X 0208 (1997) and 2223 of 64 points drawn by using Microsoft Word 2003 were printed. In addition, the printing mode was: "Plain Paper—Standard Fast" with the color matching off by a driver installed in the printer.

Incidentally, the symbols of JIS X 0208 (1997) and 2223 had squares for the exterior and the inside thereof was entirely painted.

The application conditions of Examples 1 to 10 and Comparative Examples 1 to 8 were shown in Table 1.

TABLE 1

| | Application method | Application amount (mg/cm$^2$) |
|---|---|---|
| Example 1 | Bar coat method | 6.4 |
| Example 2 | Bar coat method | 6.4 |
| Example 3 | Roll coat method | 1.6 |
| Example 4 | Roll coat method | 1.6 |
| Example 5 | Bar coat method | 6.4 |
| Example 6 | Bar coat method | 6.4 |
| Example 7 | Roll coat method | 1.6 |
| Example 8 | Roll coat method | 1.6 |
| Example 9 | Bar coat method | 6.4 |
| Example 10 | Bar coat method | 6.4 |
| Comparative Example 1 | Bar coat method | 6.4 |
| Comparative Example 2 | Bar coat method | 6.4 |
| Comparative Example 3 | Roll coat method | 1.6 |
| Comparative Example 4 | Roll coat method | 1.6 |
| Comparative Example 5 | Bar coat method | 6.4 |
| Comparative Example 6 | Bar coat method | 6.4 |
| Comparative Example 7 | Roll coat method | 1.6 |
| Comparative Example 8 | Roll coat method | 1.6 |

Thereafter, the image density of the symbols was measured using a reflection type color spectrodensitometer (manufactured by X-RITE CORPORATION).

Uneven Coloring

The symbols were printed in the same manner as in image density except that the printing mode was changed to "gloss paper—clean mode" with color matching off and thereafter uneven coloring was visually checked. The degree of uneven coloring was determined according to the following criteria:

A: No uneven coloring

B: Uneven coloring very slightly observed with no practical problem

C: Uneven coloring slightly observed with a problem

D: Uneven coloring observed

Defoamability

In an environment of 25° C., after 10 mL of the pre-processing fluid was charged into 100 mL cylinder, air having a constant pressure was infused therein until the volume of the pre-processing fluid and air bubble reached 100 mL. The time taken until all the air bubbles disappeared was measured to evaluate defoamability. Evaluation criteria are as follows: level AA: less than 60 seconds until all the air bubbles disappeared, level A: from 60 seconds to less than 150 seconds, level B: from 150 seconds to less than 300 seconds, level C: from 300 seconds to less than 600 seconds, level D: 600 seconds or greater.

The image density, uneven coloring, and defoamability of the pre-processing fluids of Examples 1 to 10 and Comparative Examples 1 to 8 are shown in Table 2.

TABLE 2

|  | Image density | | | | Uneven | |
|---|---|---|---|---|---|---|
|  | C | M | Y | K | coloring | Defoamability |
| Example 1 | 1.01 | 0.96 | 0.86 | 1.24 | A | A |
| Example 2 | 1.03 | 0.97 | 0.87 | 1.25 | A | B |
| Example 3 | 1.05 | 1.02 | 0.89 | 1.27 | A | AA |
| Example 4 | 0.98 | 0.96 | 0.84 | 1.23 | A | A |
| Example 5 | 0.98 | 0.96 | 0.86 | 1.25 | B | AA |
| Example 6 | 1.05 | 1.03 | 0.90 | 1.26 | A | AA |
| Example 7 | 0.98 | 0.95 | 0.84 | 1.23 | B | AA |
| Example 8 | 1.03 | 0.97 | 0.85 | 1.24 | A | B |
| Example 9 | 1.01 | 0.95 | 0.86 | 1.24 | A | B |
| Example 10 | 1.02 | 0.98 | 0.88 | 1.26 | A | AA |
| Comparative Example 1 | 0.98 | 0.94 | 0.82 | 1.21 | C | C |
| Comparative Example 2 | 1.01 | 0.95 | 0.83 | 1.22 | C | D |
| Comparative Example 3 | 1.00 | 0.94 | 0.84 | 1.23 | C | A |
| Comparative Example 4 | 1.01 | 0.94 | 0.82 | 1.22 | D | C |
| Comparative Example 5 | 1.00 | 0.96 | 0.83 | 1.21 | C | C |
| Comparative Example 6 | 0.99 | 0.95 | 0.83 | 1.24 | C | C |
| Comparative Example 7 | 0.98 | 0.95 | 0.84 | 1.20 | C | C |
| Comparative Example 8 | 1.01 | 0.94 | 0.84 | 1.23 | C | C |

Incidentally, C, M, Y, and K represent cyan, magenta, yellow, and black, respectively.

As seen in the results shown in Table 2, the pre-processing fluids of Examples 1 to 10 had excellent defomability while they formed images on plain paper with high image density and also subdued occurrence of uneven coloring.

Since the pre-processing fluid of Comparative Example 1 had no compound represented by Chemical formula 2, defoamability was inferior, resulting in occurrence of uneven coloring.

Since the pre-processing fluids of Comparative Examples 2, 4, and 7 had no compound represented by Chemical formula 1 but non-fluorine-containing surfactant, defoamability was inferior, resulting in occurrence of uneven coloring.

Since the pre-processing fluid of Comparative Example 3 had no compound represented by Chemical formula 1, uneven coloring was visually confirmed.

Since the pre-processing fluids of Comparative Examples 5 and 8 had no compound represented by Chemical formula 1 but non-fluorine-containing surfactant and fluorine-containing surfactant, defoamability was inferior, resulting in occurrence of uneven coloring.

Since the pre-processing fluids of Comparative Example 6 had no compound represented by Chemical formula 1 nor compound represented by Chemical formula 2, defoamability was inferior, resulting in occurrence of uneven coloring.

According to the present invention, a pre-processing fluid is provided which is capable of producing images having a high image density on plain paper and subdues occurrence of uneven coloring.

Having now fully described embodiments of the present invention, it will be apparent to one of ordinary skill in the art that many changes and modifications can be made thereto without departing from the spirit and scope of embodiments of the invention as set forth herein.

What is claimed is:

1. A pre-processing fluid comprising:
    water;
    a water soluble organic solvent;
    a water soluble flocculant;
    a compound represented by $C_6F_{13}$—$CH_2CH_2O(CH_2CH_2O)_nH$ Chemical formula 1,
    where n represents an integer of from 1 to 40; and
    a compound represented by $HOR_1R_3C$—$(CH_2)_m$—$CR_2R_4OH$ Chemical formula 2,
    where $R_1$ and $R_2$ each, independently represent alkyl groups having 3 to 6 carbon atoms, $R_3$ and $R_4$ each, independently represent methyl groups or ethyl groups, and m represents an integer of from 1 to 6.

2. The pre-processing fluid according to claim 1, wherein the compound represented by Chemical formula 1 accounts for 0.01% by weight to 1% by weight.

3. The pre-processing fluid according to claim 1, wherein the compound represented by Chemical formula 2 accounts for 0.1% by weight to 0.5% by weight.

4. The pre-processing fluid according to claim 1, wherein the water soluble flocculant comprises a water soluble aliphatic organic acid or a water soluble metal salt.

5. An ink set comprising:
    the pre-processing fluid of claim 1; and
    an aqueous pigment ink.

6. An image forming apparatus comprising:
    an application device to apply the pre-processing fluid of claim 1 to a recording medium; and
    a discharging device to discharge an aqueous pigment ink to a surface of the recording medium to which the pre-processing fluid of claim 1 is already applied.

7. An image forming method comprising:
    applying the pre-processing fluid of claim 1 to a recording medium; and
    discharging an aqueous pigment ink to a surface of the recording medium to which the pre-processing fluid of claim 1 is already applied.

* * * * *